United States Patent [19]
Ebert

[11] Patent Number: 6,024,343
[45] Date of Patent: Feb. 15, 2000

[54] AIR SPRING FOR AIR SPRING AXLES

[75] Inventor: Jörg Ebert, Köln, Germany

[73] Assignee: BPW Bergische AchsenKommanditgesellschaft, Germany

[21] Appl. No.: 09/039,108

[22] Filed: Mar. 13, 1998

[30] Foreign Application Priority Data

Mar. 15, 1997 [DE] Germany ............... 197 10 849

[51] Int. Cl.[7] .................................................. F16F 9/04
[52] U.S. Cl. .................................. 267/64.27; 267/124
[58] Field of Search ............. 267/64.11, 64.19, 267/64.21, 64.23, 64.24, 64.27, 122, 124

[56] References Cited

U.S. PATENT DOCUMENTS

| 4,506,910 | 3/1985 | Bierens | 280/711 |
|---|---|---|---|
| 4,650,166 | 3/1987 | Warmuth | 267/64.27 |
| 4,890,823 | 1/1990 | Koschinat et al. | |
| 5,180,146 | 1/1993 | Schneider et al. | 267/64.27 |
| 5,382,006 | 1/1995 | Arnold | 267/64.27 |
| 5,535,994 | 7/1996 | Safreed, Jr. | 267/64.27 |

FOREIGN PATENT DOCUMENTS

| 277 781 | 1/1970 | Austria . |
|---|---|---|
| 0296445 | 12/1988 | European Pat. Off. . |
| 3147231 | 3/1983 | Germany . |
| 42 13 676 | 10/1993 | Germany . |

OTHER PUBLICATIONS

Klaus Grüning, Umformtechnik, 3rd edition, 1982, 81–90.
Bordfeld et al, Automobil–Industrie, Jan. 1986, p. 63 ff.

*Primary Examiner*—Robert J. Oberleitner
*Assistant Examiner*—Mariano Sy
*Attorney, Agent, or Firm*—Robert W. Becker & Associates

[57] ABSTRACT

An air spring has a piston having an upper end and a lower end. A roll bellows having a first end connected to the upper end of the piston is provided. A cover is connected to the second end of the roll bellows. The lower end of the piston is open and has a connecting device for directly connecting the air spring to a pull rod of an air spring axle arrangement.

3 Claims, 4 Drawing Sheets

AIR SPRING FOR AIR SPRING AXLES

BACKGROUND OF THE INVENTION

The invention relates to an air spring for air spring axles with a cover connected to the vehicle frame and a piston connected to the rearward end of a pull rod of the axle arrangement as well as a roll bellows connected between the cover and the piston.

An air spring of the aforementioned kind is known for example, from German Patent 31 47 231. For attaching to the rearward end of a pull rod, the known piston is closed off at the lower end by a bottom plate which is connected to the pull rod by screwing and, on the other hand, is connected by screws to the piston. Such air springs in practice have proven successful, however, the massively constructed bottom plate as well as the piston must be embodied with precise guide surfaces in order to ensure in the mounted state a moisture and dirt-tight connection between the piston and the bottom plate. It is also disadvantageous that the bottom plate must have a minimum thickness in order to provide sufficient stability and stiffness of the bottom plate in the area of force transmission about the connecting points and contact surfaces with the pull rod and to thus provide sufficient stability to the piston. This means that a relatively large mass is arranged in the area of the unsprung mass of the axle arrangement. Furthermore, even minimal leaks at the connection between the piston and the bottom plate can result in moisture entering the interior of the piston and in increased corrosional stress.

For avoiding such an increased corrosional stress, additional corrosion protective measures or the use of more expensive corrosion-resistant materials is required.

It is therefore an object of the present invention to provide an air spring for air spring axle arrangements of the aforementioned kind such that they are of a simple design, can be manufactured inexpensively, and overcome the aforementioned disadvantages.

SUMMARY OF THE INVENTION

The air spring of the present invention is primarily characterized by:

A piston having an upper end and a lower end;

A roll bellows having a first end connected to the upper end of the piston;

A cover connected to a second end of the roll bellows;

The lower end of the piston being open and having a connecting device for directly connecting the air spring to a pull rod of the air spring axle arrangement.

The piston is an extruded profiled member or a cast member or an injection-molded member. The piston may be made of plastic material or fiberglass-reinforced plastic material.

Advantageously, the connecting device comprises threaded bushings, inserted into the plastic material or fiberglass-reinforced plastic material at the lower end of the piston, wherein the threaded bushings are open in a downward direction.

The connecting device may comprise a securing plate for receiving fasteners, wherein the securing plate is inserted into the plastic material or fiberglass-reinforced plastic material at the lower end of the piston.

The securing plate is preferably a cast plate or a forged plate.

The piston may consist of a cast light metal alloy, especially a cast aluminum alloy.

The piston comprises an outer wall of annular cross-section and a central support body. Radial stays are provided that connect the support body and the outer wall.

Preferably, the air spring further comprises a central support body inserted into the piston.

The air spring may also further comprise a cap securing the roll bellows to the upper end of the piston.

According to the present invention it is suggested that the piston is open in the downward direction and is directly connectable to the pull rod of the air spring axle arrangement.

The inventively embodied air spring has the advantage that for mounting of the piston the bottom plate, as known from the prior art, is no longer needed so that because of the missing mounting step of connecting the bottom plate to the piston the assembly of such an air spring is simplified and less expensive. Furthermore, the elimination of the bottom plate results in a reduction of the unsprung mass of the air spring axle arrangement so that the payload of a vehicle provided with such an air spring can be increased. Also, the downwardly open embodiment of the piston allows for a complete air exchange in the interior of the piston and thus avoids formation of a corrosion-favoring atmosphere within the piston.

According to a first embodiment of the invention, the piston is embodied as an extruded profiled member. In practice, the embodiment as an extruded profiled member is especially advantageous because the profiled member can be produced in a continuous fashion and subsequently, sections can be cut to length in order to meet the required specifications of the piston. In this manner, pistons of different lengths can be manufactured in a very simple manner, so that this embodiment provides an economically especially advantageous design of the inventive air spring.

According to a second embodiment of the invention, the piston is a cast member, preferably an injection-molded member. This embodiment of the piston allows the manufacture of profiled members with conical surfaces as well as the embodiment of projections and notches or grooves at the body of the piston.

According to a practical embodiment of the invention the piston consists of plastic material, preferably a fiberglass-reinforced plastic material. Such plastic materials have the advantage that, while having low own weight, they provide excellent stiffness and stability and have a high corrosion resistance.

According to a further embodiment of the invention the piston is comprised of a cast light metal alloy, preferably an aluminum cast alloy.

In another practical embodiment the piston has in cross-section a manufacturing-technologically optimized profiled member with a circular ring-shaped wall and mantle surface and a central support body, whereby the support body and the ring-shaped wall are connected to one another by substantially radially extending stays. Such an embodiment allows to adapt or adjust the material thickness of the profiled member forming the piston to the respective load specifications occurring at certain locations. Since the piston has a central support body for receiving the support forces for a completely vented air spring, the outer wall of the piston can be provided with reduced wall thickness because it no longer must receive support forces. The outer wall with its cylindrical mantle surface thus serves exclusively as a rolling surface for the roll bellows.

In an alternative embodiment the profiled member of the piston receives a central support body for receiving the weight forces for a vented air spring.

For securing the roll bellows at the piston as well as for an air tight closure of the roll bellows, a cap is provided at the upper end of the piston for connecting the roll bellows thereto.

For receiving the fasteners for fastening the piston to the pull rod, in addition to the embodiment of threads directly in the material of the piston, it is possible to employ threaded bushings to be inserted into the material of the piston, especially when made of plastic material, which bushings receive fasteners for attachment of the air spring to the pull rod.

In the alternative, it is also suggested to insert a securing plate into the plastic material of the piston, preferably in the form of a cast plate or a forged plate, for receiving the fasteners for securing the piston at the pull rod.

BRIEF DESCRIPTION OF THE DRAWINGS

The object and advantages of the present invention will appear more clearly from the following specification in conjunction with the accompanying drawings, in which:

FIG. 2b is a view from below onto the piston according to FIG. 2a;

DESCRIPTION OF PREFERRED EMBODIMENTS

The present invention will now be described in detail with the aid of several specific embodiments utilizing FIGS. 1 through 4.

Figure 1:
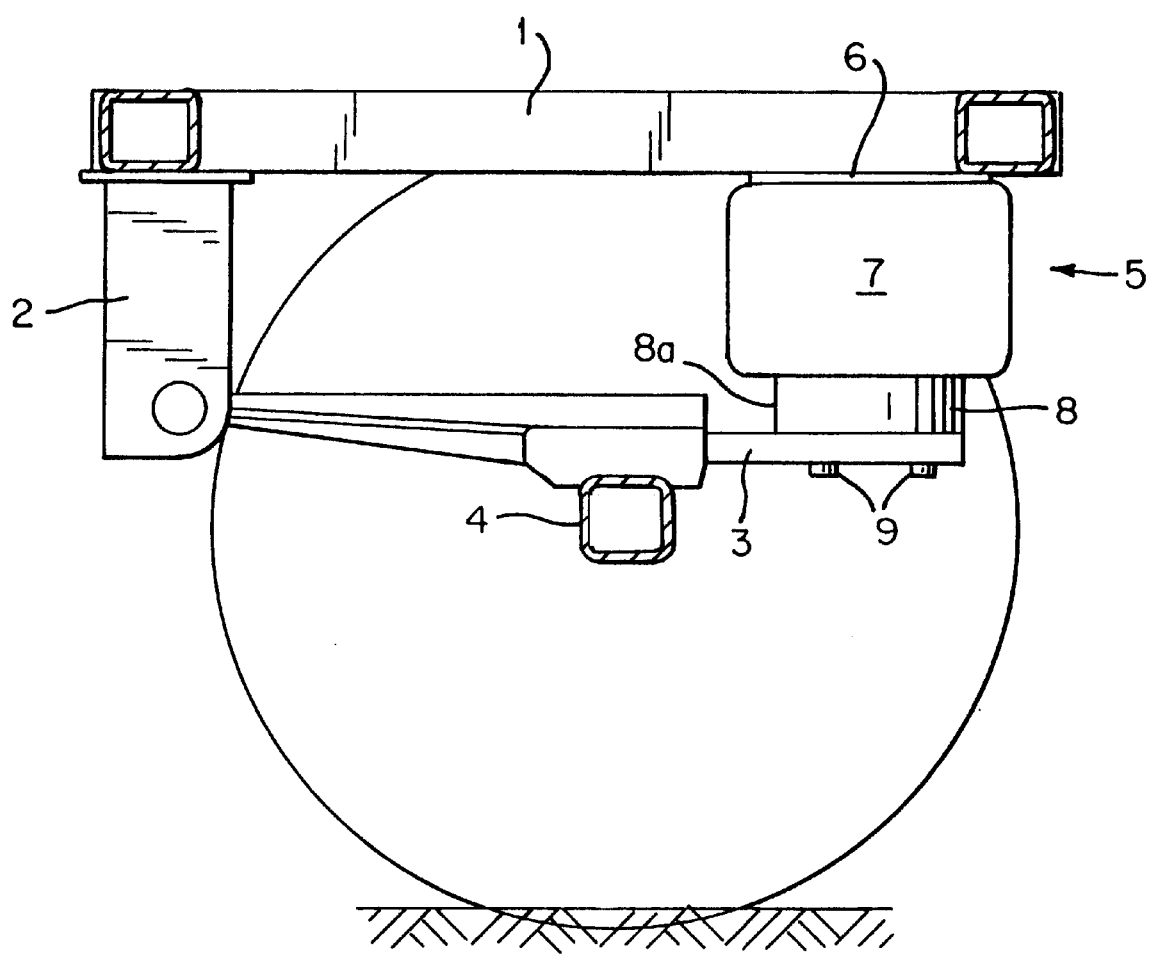
FIG. 1 is a schematic view of an air spring axle arrangement with the air spring in a partly compressed position.

The air spring axle arrangement shown in FIG. 1 shows a portion of the vehicle frame 1 and an air spring 5 that is positioned between the vehicle frame 1 and the pull rod 3 for the axle body 4. The pull rod 3 is pivotably connected on a support 2 of the vehicle frame.

The air spring 5, in principle, is comprised of a cover 6 connected to the vehicle frame 1, a roll bellows 7, and a piston 8 that is fastened to the pull rod 3. The roll bellows 7 is detachably connected to the cover 6, for example, by a non-represented spring ring. The piston 8 has a rolling surface for the roll bellows 7 in the form of a cylindrical mantle surface 8a of the outer wall and is fastened by fasteners 9 at the rearward end of the pull rod 3.

Different embodiments of the piston 8 are represented in FIGS. 2a through 4.

Figure 2B:
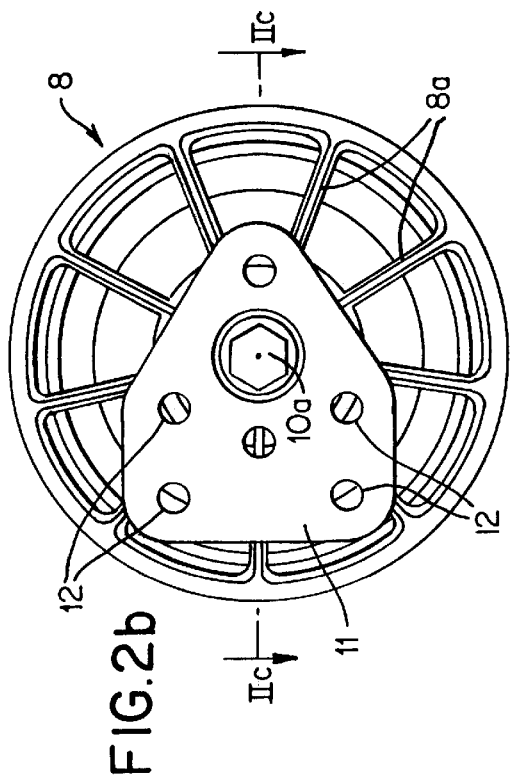
Figure 2C:
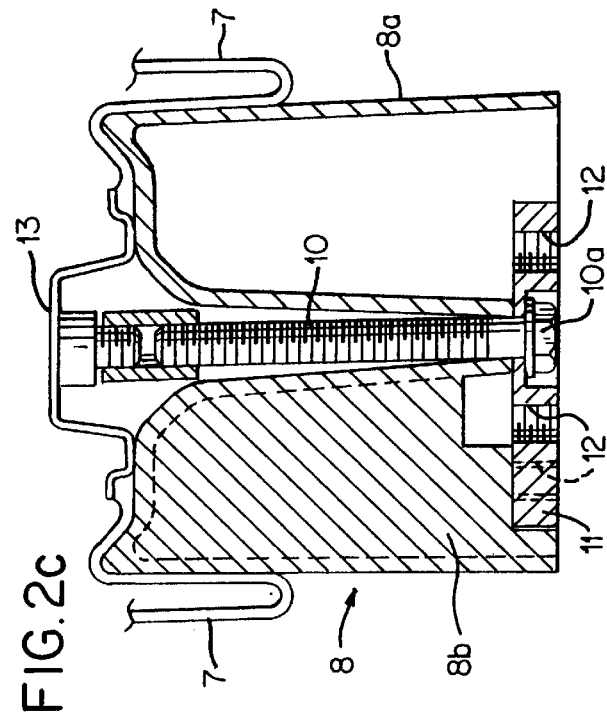
FIG. 2c is a section along the section line IIc—IIc according to FIG. 2b.
Figure 2A:
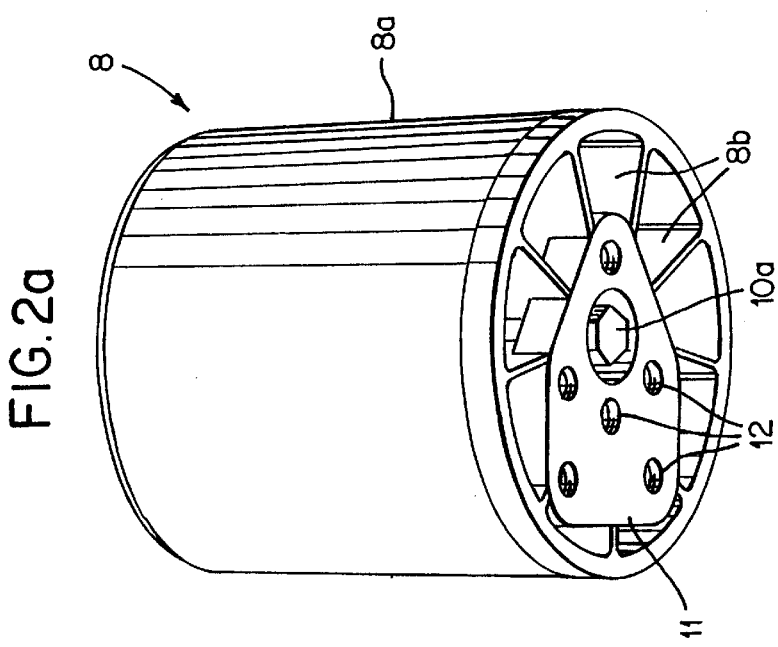
FIG. 2a is a perspective view of a first embodiment of a piston.

As can be seen in the first embodiment of the piston 8 shown in FIGS. 2a to 2c, the piston 8 is a cast profiled member, for example, an injection molded member. As can be seen especially in FIGS. 2a and 2b, the piston 8 has a thin outer wall with a circular mantle surface 8a. A plurality of stays 8b extend toward the center of the piston 8. For receiving the weight forces of the vented air spring 5, a central support body 10 is inserted into the profiled member of the piston 8, as can be seen especially in FIG. 2c. The use of such a support body 10 prevents the weight forces of the vehicle frame 1 for the vented air spring 5 from acting on the thin-walled piston 8.

For receiving the fasteners 9 for securing the piston 8 at the pull rod 3, a securing plate 11 is inserted into the lower end of the piston 8 that faces the pull rod 3, whereby the securing plate 11 has threaded bores 12 for receiving the fasteners 9, preferably in the form of screws. The roll bellows 7 at the side facing the piston is closed off by a cap 13 that is vulcanized thereto, whereby the cap 13 also serves for securing the roll bellows 7 at the piston 8. In the embodiment represented in FIG. 2, the securing plate 11 and the cap 13 are connected to one another by the central support body 10 in the form of a threaded rod and are thus also connected to the piston 8. In order to provide a planar support surface for the pull rod 3, the head 10a of the support body 10 is countersunk and flush with the surface of the securing plate 11 in the mounted state. In order to be able to secure the piston 8 in different positions on the pull rod 3, the securing plate 11 has a plurality of threaded bores 12.

Figure 3A:
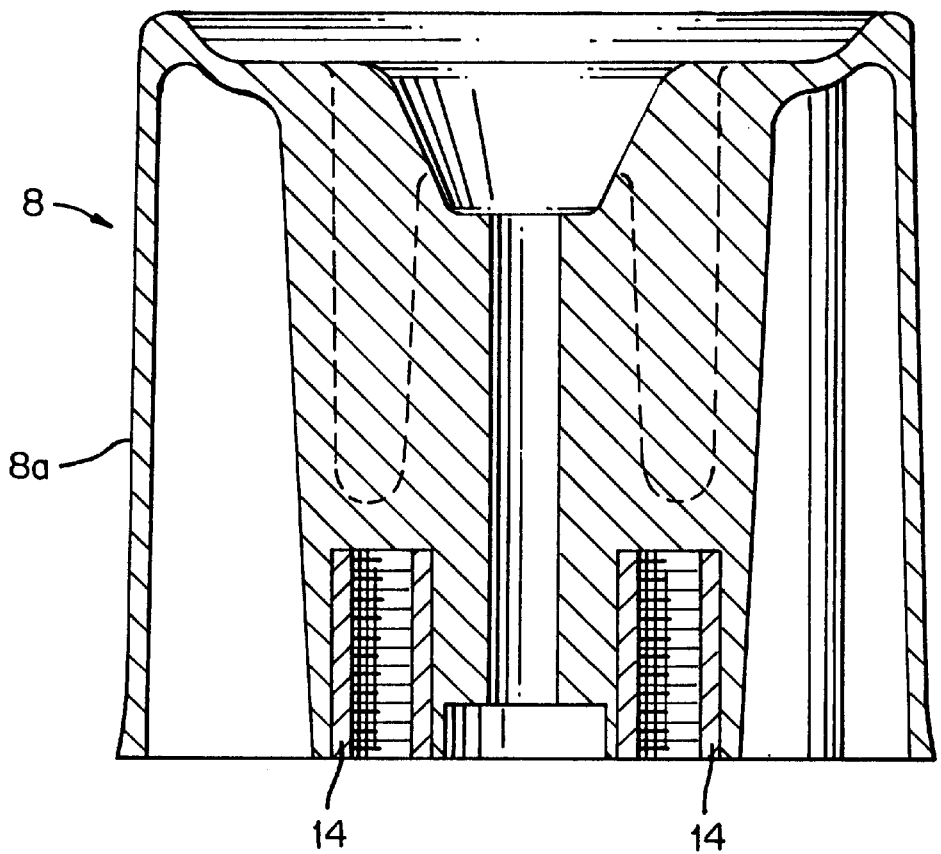
FIG. 3a is a longitudinal section of a second embodiment of a piston.
Figure 3B:
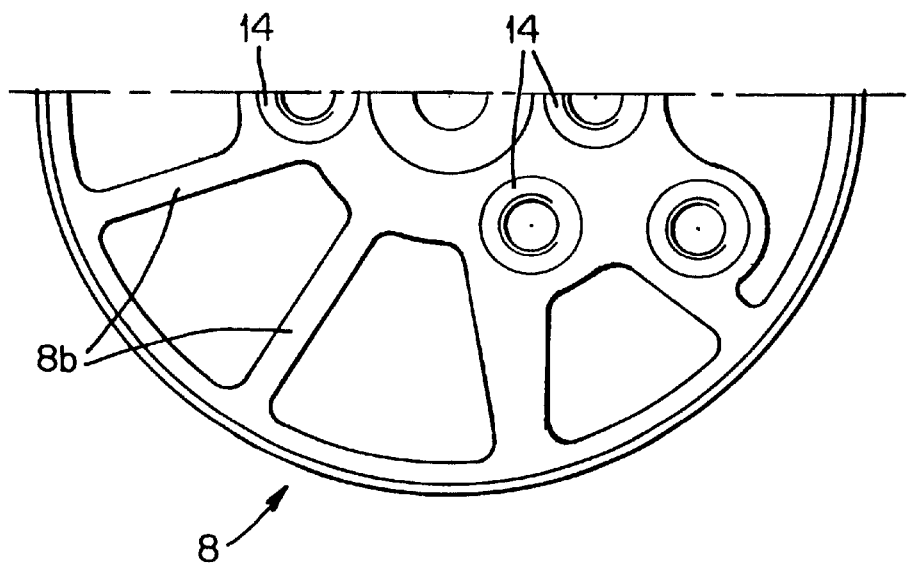
FIG. 3b is a view from below onto the piston shown in FIG. 3a in section.

The second embodiment of the piston 8 in FIGS. 3a and 3b shows a piston 8 that is again in the form of a cast member, especially an injection-molded member. For securing this piston 8 on the pull rod 3, no additional securing plate 11 is provided in contrast to the previous embodiment. For securing the fasteners 9 the material of the piston 8 has threaded bushings 14 inserted therein, as can be seen in FIG. 3a. For receiving the weight forces of the vented air spring 5, a separate support body 10 is inserted into the central opening of the profiled member of the piston, as can be seen in an exemplary manner in FIG. 2c. In order to be able to fasten the embodiment of the piston 8 in different positions on the pull rod 3, a plurality of threaded bushings 14 are provided within the material of the piston 8, as can be seen in the representation of FIG. 3b.

Figure 4:
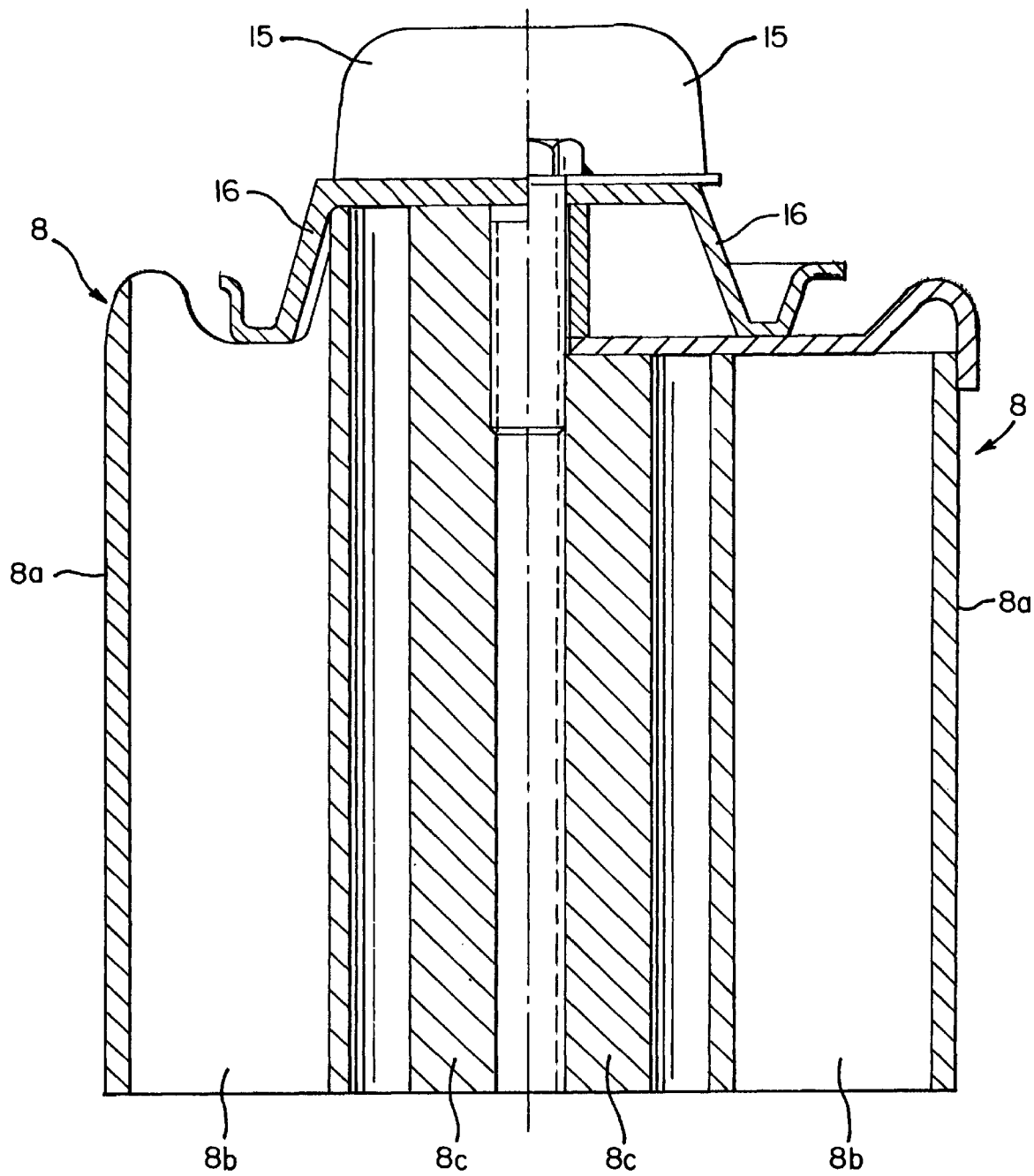
FIG. 4 shows a longitudinal section of a third and fourth embodiment of the piston, whereby only one half is respectively shown.

FIG. 4 shows two further embodiments of the piston 8. In both cases, the piston 8 is an extruded profiled member. This embodiment has the advantage that the material of the profiled member can be produced as a continuous material, which is subsequently cut to length as needed for the piston 8.

The embodiment illustrated in the right half of FIG. 4 shows the extruded profiled member cut to length from the continuous extruded material by sawing at both ends.

In the embodiment shown in the left half of FIG. 4, the profiled member was cut to length at the lower end facing the pull rod and was machined by cutting at the upper end facing the roll bellows in order to provide different profile heights.

In contrast to the embodiment represented in FIGS. 2a through 3b, in these represented embodiments it is not necessary to provide a support body 10 for receiving the weight forces of the vented air spring 5. As can be seen in FIG. 4, these piston profiled members comprise a central support body 8c as a unitary part of the material of the piston which are connected by radially extending stays 8b to the outer wall with the cylindrical mantle surface 8a.

In the embodiment shown in the right half of FIG. 4, the roll bellows is closed off by a cap 13. For securing the non-represented roll bellows 7 at the piston, the central support body 8c can be connected at the end facing the roll bellows, for example, by a screw within an end cap 16 that supports a buffer 15.

For securing the piston at the pull rod 3, it is also possible to employ screws that are threaded into threads that are directly machined into the material of the piston. In such an embodiment the threaded bushings 14 or the securing plate 11 is eliminated.

In all represented embodiments the piston 8 can be connected directly, i.e., without interposition of a bottom plate known from the prior art, to the rearward end of the pull rod 3. The downwardly open piston profiled member furthermore has the advantage that because of the missing bottom plate a constant air exchange within the profiled member of the piston takes place so that no corrosion-favorable atmosphere will form within the interior of the piston 8.

The specification incorporates by reference the disclosure of German priority document 197 10 849.0 of Mar. 15, 1997.

The present invention is, of course, in no way restricted to the specific disclosure of the specification and drawings, but also encompasses any modifications within the scope of the appended claims.

What is claimed is:

1. An air spring comprising:

a piston, made of plastic material, having an upper end and a lower end;

said piston comprising an outer wall and a coaxial inner wall;

a roll bellows having a first end connected to said upper end of said piston;

a cover connected to a second end of said roll bellows;

said lower end of said piston being open and having a connecting device for directly connecting said air spring to a pull rod of an air spring axle arrangement;

wherein said connecting device comprises a securing plate for receiving fasteners;

wherein said securing plate is inserted into said plastic material at said lower end of said piston;

a cap securing said roll bellows to said upper end of said piston;

a central support body inserted into a space delimited by said inner wall of said piston;

said central support having a first end and a second end, wherein said first end is connected to said cap and said second end is connected to said securing plate.

2. An air spring according to claim 1, wherein said securing plate is a cast plate or a forged plate.

3. An air spring according to claim 1, wherein said plastic material is fiberglass-reinforced.

* * * * *